US006905100B2

(12) United States Patent
Franck et al.

(10) Patent No.: US 6,905,100 B2
(45) Date of Patent: Jun. 14, 2005

(54) REDETACHABLE ADHESIVE STRIPS HAVING SLIP-RESISTANT GRIP TABS

(75) Inventors: Achim Franck, Hamburg (DE); Andreas Junghans, Hamburg (DE); Andreas Wieck, Halstenbek (DE)

(73) Assignee: Tesa AG, Hamburg (DE)

( * ) Notice: Subject to any disclaimer, the term of this patent is extended or adjusted under 35 U.S.C. 154(b) by 142 days.

(21) Appl. No.: 10/014,709

(22) Filed: Dec. 11, 2001

(65) Prior Publication Data

US 2002/0119309 A1 Aug. 29, 2002

(30) Foreign Application Priority Data

Dec. 22, 2000 (DE) ......................... 100 64 160

(51) Int. Cl.[7] ................................. C09J 7/02
(52) U.S. Cl. ................. 248/205.3; 428/343; 428/354; 428/355 BL; 248/303; 427/208
(58) Field of Search .................. 428/354, 355 BL, 428/343; 248/205.3, 303; 427/208

(56) References Cited

U.S. PATENT DOCUMENTS

| | | | | |
|---|---|---|---|---|
| 4,024,312 | A | 5/1977 | Korpman .................... | 428/343 |
| 5,409,189 | A | 4/1995 | Lühmann ................... | 248/205.3 |
| 5,491,012 | A | 2/1996 | Lühmann et al. | |
| 5,507,464 | A | 4/1996 | Hamerski et al. ........... | 248/683 |
| 5,626,931 | A | 5/1997 | Lühmann ................... | 428/40.1 |
| 5,626,932 | A | 5/1997 | Lühmann et al. | |
| 5,672,402 | A | 9/1997 | Kreckel et al. ............ | 428/34.2 |
| 5,897,949 | A | 4/1999 | Lühmann et al. ......... | 428/317.3 |
| 5,925,459 | A | 7/1999 | Zimmermann et al. ..... | 428/354 |
| 6,004,665 | A | 12/1999 | Lühmann et al. ........... | 428/317 |
| 6,086,973 | A | 7/2000 | Hazes ....................... | 428/40.1 |
| 6,106,953 | A | 8/2000 | Zimmermann et al. ..... | 428/440 |
| 6,245,177 | B1 | 6/2001 | Lühmann .................... | 156/249 |
| 6,284,378 | B1 | 9/2001 | Junghans et al. ........... | 428/421 |
| 6,342,720 | B1 | 1/2002 | Presting et al. ............. | 257/440 |
| 6,413,626 | B1 * | 7/2002 | Wollner ................... | 428/317.3 |
| 2002/0119309 | A1 * | 8/2002 | Franck et al. ............... | 428/343 |

FOREIGN PATENT DOCUMENTS

| | | | | |
|---|---|---|---|---|
| DE | 33 31 061 | 3/1985 | ............ | A61N/1/42 |
| DE | 42 33 872 | 3/1994 | .............. | C09J/7/02 |
| DE | 44 31 914 A1 | 3/1996 | .............. | C09J/7/02 |
| DE | 44 28 587 | 6/1996 | .............. | C09J/7/00 |
| DE | 196 27 400 | 7/1996 | | |
| DE | 195 11 288 | 10/1996 | .............. | C09J/5/00 |
| DE | 195 31 696 | 3/1997 | .............. | C09J/7/02 |
| DE | 197 20 526 | 5/1997 | | |
| DE | 42 22 849 C1 | 6/1997 | .............. | C09J/7/00 |
| DE | 197 26 375 | 6/1997 | | |
| DE | 197 08 366 | 1/1998 | .............. | C09J/7/02 |
| DE | 196 49 636 | 6/1998 | .............. | C09J/7/02 |
| DE | 196 49 727 | 6/1998 | .............. | C09J/7/02 |
| DE | 196 49 728 | 6/1998 | .............. | C09J/7/02 |
| DE | 196 49 729 | 6/1998 | .............. | C09J/7/02 |
| DE | 297 23 198 | 10/1998 | ........... | B42D/9/00 |
| DE | 197 20 145 | 11/1998 | .............. | C09J/7/02 |
| DE | 197 23 177 | 12/1998 | ......... | H01L/31/101 |
| DE | 197 56 816 | 2/1999 | ............ | A47G/1/06 |
| DE | 196 26 870 | 7/1999 | | |
| DE | 197 56 084 | 7/1999 | .............. | C09J/7/00 |
| DE | 198 49 199 | 4/2000 | .............. | C09J/7/02 |
| EP | 0 747 027 | 12/1996 | ........... | A61F/13/02 |
| WO | WO 92/11332 | 7/1992 | .............. | C09J/7/02 |
| WO | WO 92/11333 | 7/1992 | .............. | C09J/7/02 |
| WO | WO 94/21157 | 9/1994 | ............ | A47G/1/17 |
| WO | WO 95/06691 | 3/1995 | .............. | C09J/7/02 |
| WO | WO 97/07172 | 2/1997 | .............. | C09J/7/02 |
| WO | WO 98/03601 | 1/1998 | .............. | C09J/7/02 |
| WO | WO 99/31193 | 6/1999 | .............. | C09J/7/02 |
| WO | WO 99/37729 | 7/1999 | .............. | C09J/7/02 |
| WO | WO 99/63018 | 12/1999 | .............. | C09J/7/02 |

OTHER PUBLICATIONS

Specification—U.S. Appl. No. 09/160,777 filed Sep. 24, 1998 English language counterpart to DE 195 31 696.
Specification—U.S. Appl. No. 09/073,509 filed May 6, 1998 English language counterpart DE 197 20 145.
Specification—U.S. Appl. No. 08/976,802 filed Nov. 24, 1997 English language counterpart to DE 196 49 728.
Specification—U.S. Appl. No. 08/886,306 filed Jul. 1, 1997 English language counterpart to DE 196 26 870.

* cited by examiner

*Primary Examiner*—Daniel Zirker
(74) *Attorney, Agent, or Firm*—Norris McLaughlin & Marcus PA

(57) ABSTRACT

An adhesive sheet strip, single-sidedly or double-sidedly pressure-sensitively adhering, redetachable by extensive stretching pulling on a grip tab in the direction of the bond plane, wherein the grip tab is such that it has a static frictional force Fs of at least 170 cN.

7 Claims, No Drawings

REDETACHABLE ADHESIVE STRIPS HAVING SLIP-RESISTANT GRIP TABS

The invention relates to single-sidedly or double-sidedly pressure-sensitively adhesive sheet strips which may be redetached without residue or destruction by extensive stretching in the bond plane.

PRIOR ART

Highly elastically or plastically extensible self-adhesive tapes which may be redetached without residue or destruction by extensive stretching in the bond plane (also referred to below as strippable self-adhesive tapes) are known from U.S. Pat. No. 4,024,312, DE 33 31 016, WO 92/11332, WO 92/11333, DE 42 22 849, WO 95/06691, DE 195 31 696, DE 196 26 870, DE 196 49 727, DE 196 49 728, DE 196 49 729, DE 197 08 366, and DE 197 20 145.

They are frequently used in the form of single-sidedly or double-sidedly pressure-sensitively adhesive sheet strips (adhesive tape strips, adhesive strips), which preferably have a nonadhesive grip tab region from which the detachment process is initiated. Particular applications of such self-adhesive tapes may be found, inter alia, in DE 42 33 872, DE 195 11 288, U.S. Pat. No. 5,507,464, U.S. Pat. No. 5,672,402, and WO 94/21157; specific embodiments are described, for example, in DE 44 28 587, DE 44 31 914, WO 97/07172, DE 196 27 400, WO 98/03601, and DE 196 49 636, DE 197 20 526, DE 197 23 177, DE 297 23 198, DE 197 26 375, DE 197 56 084, DE 197 56 816, WO 99131193, WO 99/37729, and WO 99/63018.

Preferred areas of use of the abovementioned strippable adhesive sheet strips include, in particular, the residuelessly and nondestructively redetachable fixing of light to moderately heavy articles in the home, workplace, and office segments. In these applications they replace conventional fastening means, such as drawing pins, roundhead needles, thumbtacks, nails, screws, conventional self-adhesive tapes, and liquid adhesives, to name but a few. Key to the successful use of the abovementioned adhesive sheet strips is not only the quick and easy bonding and the secure hold they provide for the envisaged period of bonding but also the possibility of the residueless and nondestructive redetachment of bonded articles. It should be borne in mind in particular here that for the functional capacity of the adhesive strips in the redetachment process it is necessary to ensure reliable holding of the grip tab throughout this process.

Commercial products currently on the market (e.g., tesa® Powerstrips®,tesa® Powerstrips® mini, tesa® Poster-Strips from Beiersdorf AG, 3M Command® Adhesive strips from 3M, and Plastofixe Formule Force 1000 adhesive strips from Plasto S. A.) all have grip tab regions which are presented in a wide variety of different forms, such as, for example, adhesive regions of the adhesive sheet strips that are covered with thin polymer films (e.g., tesa® Powerstrips®), thin polymer films protruding centrally from the adhesive composition in the plane of the adhesive sheet strip (e.g., Plastofix® Formule Force 1000 adhesive strips), and intermediate carriers without a coating of adhesive composition (e.g., 3M Command® adhesive strips). Polymer films with the aforementioned utility may be improved in their usefulness by a reduction in UV transmittance and may have been treated on the side facing the adhesive composition in such a way as to assist tearing-free redetachment by extensive stretching. Such films may also be colored (e.g., tesa® Powerstrips® Freestyle).

The aforementioned and further characterizations of the grip tabs are described, inter alia, in WO 92111 333, DE 42 22 849, DE 44 31 914, DE 196 27 400, WO 98/03 601, DE 196 49 636, and DE 198 49 199.

DISADVANTAGES OF THE PRIOR ART

A disadvantage of the above-described products which are available on the market is that it is easy for the grip tab to slip free in the course of extensive stretching. Although DE 44 31 914 describes not release coating the side of the grip tab film which faces the skin, this does not achieve a sufficiently reliable grip.

Indeed, where the grip tab slips out from the fingers of the user, the process of redetachment by extensive stretching in the bond plane is critically interrupted. Not uncommonly, interruptions of this kind in the redetachment process or equally harmful regripping lead to tearing: a failure which the user rightly associates with, ultimately, a lack of product quality.

A further disadvantage in the prior art is that during the redetachment process the user is forced to grip very firmly in order to be able to hold the grip tab. Not uncommonly, this firm hold is achieved with the aid of fingernails, at the edge of which the stretched adhesive sheets may then tear: a grave disadvantage.

It was therefore an object of the invention to develop self-adhesive strips, redetachable without residue or destruction by extensive stretching in the bond plane, which are more readily gripped, especially those which have an increased grip (frictional force) in the grip tab regions, thereby favoring a secure hold during the process of redetachment by extensive stretching.

DESCRIPTION OF THE INVENTION

This object is achieved by providing the self-adhesive strips with a grip tab having a static frictional force Fs, as measured in accordance with DIN 53375, of at least 170 cN.

In particular, the surfaces of the grip tab regions are specially characterized, e.g., coated with silicones (e.g., platinum catalyzed, addition crosslinked, solvent free types), preference being given to compounds which in use have a deformable (plastic and/or elastic) character. Similar effects are also achieved, for example, by using ethylene-vinyl acetate copolymers or polyurethane compounds, for example. In addition, the surfaces may be slightly tacky, but in particular with only a low initial tack, in order to prevent dirt particles gaining an adequate hold in the course of bonding. The abovementioned substances may be present either over the entire area or else partially (in the form of stripes or dots, for example) on the grip tab.

Suitable processes for producing such surfaces according to the invention when using backing materials (e.g., PET sheet) include, for example, surface coating technology, printing technology, including screen printing technology, and also coextrusion. Alternatively, the grip tab surfaces according to the invention may also be designed using a material which can be used as a grip tab region without further surface modification (e.g., EVA sheets and polyurethane sheets).

A further possibility for increasing the grip of the grip tab is to provide the grip tab surfaces with coarse and fine structures by means, for example, of etching, grinding or embossing. Structured surfaces of this kind exhibit high grip tab grip especially when such modifications are performed on materials which are already furnished with high frictional forces.

All of the variants described feature a markedly higher grip tab grip than in the prior art.

Adhesive Sheets

Adhesive sheets furnished with grip tab regions having good grip in accordance with the invention comprise, in particular, those in accordance with U.S. Pat. No. 4,024,312, DE 33 31 016, WO 92111333, DE 42 22 849, WO 95/06691, DE 196 26 870, DE 196 49 727, DE 196 49 728, DE 196 49 729, and DE 197 08 366, which use pressure-sensitive adhesive (PSA) compositions based on elastomer/resin mixtures. In particular, the adhesive sheets used in accordance with the invention use PSA compositions based on polymeric dienes, such as natural rubber, synthetic polyisoprene, and polybutadiene, for example. Furthermore, these adhesive sheets use PSA compositions based on styrene block copolymers. Preferred styrene block copolymers include those containing elastomer blocks based on 1,3-dienes, such as polyisoprene, polybutadiene, and isoprene-butadiene copolymers, for example, and partially or fully hydrogenated analogs of the aforementioned systems. Furthermore, these adhesive sheets use PSA compositions based on random copolymers of conjugated dienes and other polymerizable compounds, such as, for example, styrene-butadiene copolymers or acid functionalized styrene-butadiene copolymers, to name but a few. Furthermore, adhesive sheets to be protected against tearing in accordance with the invention use PSA compositions based on polyolefinic elastomers. In accordance with the invention it is also possible to use adhesive sheets having PSA compositions based on mixtures of abovementioned elastomers and also based on blends of abovementioned elastomers with further polymers.

Double-sidedly/Single-sidedly Pressure-sensitively Adhering Self-adhesive tapes

Grip tab regions according to the invention may be used both for single-sidedly and for double-sidedly pressure-sensitively adhering self-adhesive tapes that are redetachable without residue or destruction by extensive stretching. In this case, single-sidedly pressure-sensitively adhering self-adhesive tapes may also, for example, be furnished on one side only with a grip tab region according to the invention.

Production of Modified Grip Tab Regions for Examples

Grip tab regions according to the invention, in the case of modification, were in each case produced on the basis of a sheet carrier of polyethylene terephthalate (25 μm PETP/B, Laufenberg GmbH) (# A to D) or by using sheets formed into webs (#E).

Particularly suitable grip tab regions are those in- accordance with DE 42 22 849, DE 44 31 914, EP 747027, DE 196 27 400, DE 194 49 636, and DE 198 49 199.

Production of Use-Compliant Adhesive Sheet Specimens for Examples

On the commercial product tesa® Powerstrips® Art. 58000, the grip tab films were removed on both sides and placed at the same position on both sides and in the same section size by web-formed sheets modified in accordance with the invention.

Test Methods

Determination of Frictional Properties in accordance with DIN 53375-B

The test setup is chosen so that the frictional properties of surfaces according to the invention of grip tab regions for investigation is investigated with respect to a skinlike surface (here, PE foam ALVEOLIT TEE 0800.55 from ALVEO). For this purpose, testing was carried out as described in DIN 53375. The friction block had a contact area of 10 cm² (5 cm×2 cm). The friction partner ALVEOLIT TEE 0800.55 was chosen here instead of the felt covering described in the standard, in order to create a surface which is skinlike particularly in its compression and deformation behavior. The total mass of the friction block was 100 g. The force was measured using a spring balance.

Determination of Behavior in a Realistic Redetachment Process

The adhesive sheet specimens residuelessly redetachable by stretching (L×W=50×20 mm) were bonded to glazed tiles in such a way that the grippable region ends with the edge of the bonded joint. For this purpose the adhesive strip (its top side covered with release paper) was placed on the tile and pressed on by rolling over it 6 times (at 10 m/s) using a 2 kg pressing roller. Baseplates of commercially available tesa® Powerstrips® system hooks have their release paper removed and were then stuck on using pressure (10 s, 100 N) acting uniformly and vertically on the whole adhesive composition in such a way that the entire adhering region of the adhesive strip was covered.

Specimens prepared in this way were assessed within 24 h after storage at room temperature by removing the adhesive strips manually from the bond joint by pulling stretchingly on the nonadhering grip region (the maximum angle to the bond face during detachment was 50°, the typical detachment speed was about 10 cm/s). An assessment was made of whether the adhesive strip was detachable without tearing or residue in the manner described without the grip tab slipping from the user's fingers.

EXAMPLES

Using the test setup described, in accordance with DIN 53375, the following frictional properties were detected on selected surfaces

| # | Surface type | Surface Structure | Static frictional force $F_s$ (cN) |
|---|---|---|---|
| A | Unmodified PET | Smooth | 60 |
| B | Silicone varnish A* | Smooth | 20 |
| C | Silicone varnish B* | Smooth | 210 |
| D | EVA primer containing 28% VAc* | Smooth | 240 |
| E | Metallocene cat. EVA* | Perforated sheet | >580 |

*Features of the base materials used:
Silicone release varnish A condensation crosslinked, solventborne, 0.25 g/m²
Silicone release varnish B addition crosslinked with Pt catalysis, solvent free, 0.20 g/m²
EVA primer containing 28% VAc from surface protective film, 5 g/m²
Perforated sheet of metallocene-cat. EVA, Flexfil X-16047 (Tredegar)

| # | Frequency of slippage of the grip tab (%) | Consequences |
|---|---|---|
| A | 50 (once each/test) | 35% tearing** |
| B | 60 (once each/test) + 20 (twice each/test) | 65% tearing** |
| C | 5 (once each/test) | No tearing |
| D | 0 | No tearing |
| E | 0 | No tearing |

**Primarily as a result of regripping after the grip tab had slipped from the user's fingers. Use-compliant adhesive sheets according to the invention that are redetachable by extensive stretching adhere immediately in such cases, prior to regripping, on near-lying surfaces, so that in the subsequent recommended stretching process there is severe distortion and, consequently, tearing of the adhesive sheets.

Clear advantages result in the realistic redetachment behavior of adhesive sheet specimens which have been appropriately finished in accordance with the invention with high frictional force levels (=grip) in the grip tab regions.

What is claimed is:

1. A single -or double-sided pressure sensitive adhesive film strip, having a grip tab and being redetachable from a substrate to which it is adhered by pulling on the grip tab to extensively stretch the film strip, wherein the surface of the grip tab is coated, etched, around or embossed to increase its static frictional force Fs, as measured in accordance with DIN 53375, to at least 170 cN.

2. The strip as claimed in claim 1, wherein said static frictional force Fs is increased to at least 200 cN.

3. The strip as claimed in claim 1, wherein the grip tab has said increased static frictional force on one or both sides.

4. The strip as claimed in claim 1, wherein the grip tab is coated with a deformable composition, or a low-tack composition, or both.

5. The strip as claimed in claim 4, wherein said deformable composition, low tack composition, or both are selected from the group consisting of silicones, ethylene-vinyl acetate copolymers, polyurethane compounds and combinations thereof.

6. The strip as claimed in claim 1, wherein the grip tab is formed of ethylene-vinyl acetate or polyethylene sheet material.

7. A method for redetachable bonding with an adhesive strip where the bond is broken by pulling on a grip tab on the adhesive strip to extensively stretch the adhesive strip, without slippage from the grip tab, wherein said adhesive strip is an adhesive strip according to claim 1.

* * * * *